United States Patent Office 2,844,482
Patented July 22, 1958

2,844,482
ADHESIVE COMPOSITION

Donald F. Maskey, Memphis, Tenn., assignor, by mesne assignments, to The Buckeye Cellulose Corporation, Cincinnati, Ohio, a corporation of Ohio No Drawing. Application September 12, 1955
Serial No. 533,897

6 Claims. (Cl. 106—154)

This invention relates to vegetable protein-containing adhesive compositions suitable for solid fiber laminating and capable of developing a water resistant bond.

More particularly this invention relates to liquid adhesive compositions comprising in combination a substantially unhydrolyzed soybean protein, clay, sodium sulfite, and glyoxal.

Various modifications of protein-containing adhesives to develop water resistant bonds therewith have been heretofore suggested. These modifications have normally been accomplished through the action of some chemical agent which serves to insolubilize the protein in the adhesive. Among the agents which have been suggested for such applications are various aldehydes or aldehydic derivatives such as formaldehyde, butyraldehyde, crotonaldehyde and glyoxal. These particular agents have been added directly to the adhesive composition to be used for gluing or have been applied to protein-containing compositions in the form of a vapor, or as a liquid wash or bath in the case where the insolubilization of a paper coating is sought, to insolubilize the protein. The use of such supplementary aldehydic agents has given rise to a number of disadvantages which have made their widespread application relatively unattractive. For example, those adhesive compositions to which an aldehydic protein-insolubilizing agent has been added directly normally have too short a pot life for many applications, i. e., the time interval from completion of the adhesive formulation until the adhesive becomes useless because of changed characteristics is too short for practical considerations of use. Also, a number of aldehydic agents, for example glyoxal, are not compatible with a dispersion of protein in a solution of a strong caustic such as sodium hydroxide. If, in the preparation of an adhesive composition containing protein so dispersed, glyoxal is added, the composition rapidly sets to an unusable mass. Then too, when aldehydic agents such as formaldehyde and paraformaldehyde are to be used, and particularly where application of such protein insolubilizing agents is to be made in vapor form, a pronounced safety hazard is encountered.

I have now unexpectedly found that the foregoing and other disadvantages generally associated with prior protein-containing adhesive compositions utilizing aldehydic materials as protein-insolubilizing agents can be overcome by providing a liquid adhesive composition comprising in admixture a substantially unhydrolyzed soybean protein, clay, sodium sulfite and glyoxal in certain proportions.

It is an object of this invention to provide a liquid adhesive composition suitable for solid fiber laminating comprising a substantially unhydrolyzed soybean protein, clay, sodium sulfite and glyoxal, which has a pot life of at least about 72 hours.

A further object of my invention is to provide a liquid adhesive composition which will produce a waterproof bond without additional treatment after the gluing operation.

Other objects and advantages will be apparent from the following description.

Whenever herein I refer to solid fiber laminating, I mean the gluing together of pieces of paper and/or solid paperboard (as distinguished from corrugated paper or paperboard) such as in convolute drum winding and continuous solid ply laminating. I also intend to include within the term "solid fiber laminating" the gluing of paper and/or paperboard to wood.

I have found that the foregoing and related objects may be accomplished by providing a liquid adhesive composition comprising from about 10% to about 16% by weight of a substantially unhydrolyzed, chemically isolated, soybean protein, a clay of the kaolinite class comprising from about 140% to about 280% by weight of the protein, from about 8% to about 11.5% sodium sulfite, from about 1.7% to about 2.2% glyoxal, both by weight of the protein and an amount of water such that the total solids content of the liquid adhesive composition is from about 37% to about 44%.

In order that the advantages exhibited by my compositions may be realized the protein constituent of the hereinbefore defined adhesive compositions must be a substantially unhydrolyzed, chemically isolated, soybean protein and should comprise from about 10% to about 16% by weight of the adhesive composition. Amounts of protein substantially less than 10% by weight of the composition result in decreased efficiency in the bonding power and water resistance characteristics of the adhesive while amounts in excess of 16% by weight give rise to difficulties in controlling the viscosity of the adhesive composition.

Proteins which are "hydrolyzed" have been treated with reagents (for example, acid or alkali) which effect, according to the best current belief, first an unfolding of the substantially globular native protein molecule into an extended chain configuration of difficult solubility and high solution viscosity, and then a partial depolymerization by hydrolysis of sensitive bonds in the main molecular chain which breaks the molecule down into shorter fragments and results in a lowered solution viscosity and improved solubility. "Unhydrolyzed" proteins in contrast are substantially in the native globular state and have not undergone this unfolding and depolymerization of the protein molecule.

An "unhydrolyzed" protein may be distinguished from a "hydrolyzed" protein by its greater sensitivity to heat and alkali. Concentrated solutions of unhydrolyzed protein gel quite easily upon heating or upon the addition of sufficient alkali to initiate the unfolding-depolymerization process described above.

U. S. Patent 2,431,993 shows graphically the course of alkaline hydrolysis of soybean protein. A low viscosity protein, such as is desired for paper coating, must have been so treated as to have undergone substantially no hydrolysis (which would place it at the left side of the curve shown in that patent), or have been hydrolyzed through a high-viscosity stage to a low final viscosity (which would place it at the right hand side of the curve shown in that patent). The proteins contemplated for use in the compositions of my invention are called substantially unhydrolyzed because they are at or near their initial low viscosity without ever having been through the high viscosity stage which must be traversed before reaching the low viscosity hydrolyzed product of most commercial proteins.

A conventional method for producing a substantially unhydrolyzed, chemically isolated, soybean protein is described, for example, in Example 1 of U. S. 2,451,659 to Calvert.

Although in general protein-containing vegetable flours, i. e. soybean flour, are not adaptable to my adhesive compositions because of the adverse effect the carbohydrate content of such flours has on the water resistance characteristics of the adhesives produced therefrom, it is to be understood that small amounts of carbohydrate, e. g. up to about 5% by weight of the protein, can be tolerated without substantially adversely affecting the water resistance characteristics of our adhesives.

Dispersion of the protein is accomplished through the addition to the composition of from about 8% to about 11.5% sodium sulfite, based on the weight of the protein. Amounts of sodium sulfiite less than about 8% may give rise to dispersion difficulties, while amounts in excess of about 11% will result in adhesive compositions which will not consistently result in water resistant bonds.

The clays which have been found suitable for our compositions are those composed of hydrated aluminum silicate and are referred to in the trade as kaolinite class clays. These are distinguished from the montmorillonite clays wherein a portion of the alumnium has been replaced with magnesium and ferric oxide. I have found that this latter type of clay is not suitable for use in my composition because of its high colloidal activity and its tendency to hydrate, with the subsequent production of plastic and gel-like water systems—an effect which is detrimental to the flow properties of the adhesive compositions.

The addition of the clay constituent in the compositions of my invention serves to promote better filling properties, stronger adhesive bonds, improved tack, shortened drying time and a more rapid development of satisfactory water resistance.

Many of the various commerically available kaolinite clays sold for paper filling or coating applications may readily be used in my compositions. Examples of such clays are KCS, "Hydrite," and "Premax," all marketed by Georgia Kaolin Co. of Elizabeth, New Jersey, Special Hydratex, marketed by F. M. Huber Co., of New York, N. Y. and ASP 600 and ASP 100, marketed by Edgar Bros. Company of Metuchen, New Jersey.

I preferably add the glyoxal in an amount from about 1.7% to about 2.2% by weight of the protein in the form of a 5% aqueous solution. With amounts of glyoxal less than about 1.7% satisfactory water resistance is not obtained. Amounts in excess of 2.2% result in an insolubilization of the protein in the unapplied liquid adhesive (presumably because insufficient sulfite ions are present to tie up the glyoxal and retard the protein-glyoxal reaction as hereinafter described) and a consequent failure of such adhesive, when applied, to give a water resistant bond.

For satisfactory performance in most commercial applications I have found that my liquid adhesive compositions should have a total solids content in the range from about 37% to about 44%. Normally, however, in order to obtain optimum performance, I have found that a solids content of about 40% is most desirable. It is to be understood, however, that the solids content of my compositions will of course vary depending upon the particular application for which they are employed. Thus, depending upon the particular characteristics, such as tack and the particular viscosity required in an adhesive for a specific application, the total solids content may vary as much as 5% in either direction from the preferred value of about 40%. In all my compositions it is desirable to keep the water content at a minimum compatible with good handling characteristics, in the interests of avoiding undue addition of moisture to the paper and/or paperboard being glued.

The adhesive compositions of my invention may be conveniently prepared by slurrying the kaolinite class clay in water and agitating until the clay is completely dispersed, mixing the resultant slurry with the substantially unhydrolyzed soybean protein and sodium sulfite, agitating the resultant mixture for about one hour, adding the aqueous glyoxal solution while continuing the agitation and then agitating the final mixture to insure a thorough dispersion of all the constituents, the foregoing limitations on the relative quantities of constituents being observed at all times. This process may be satisfactorily conducted at a temperature in the range from about 65° to about 100° F. However, because of viscosity considerations, I prefer to carry out the process at a temperature of from about 65° to about 75° F.

Although I do not wish to be bound by any theoretical considerations, I believe that in the clay-protein-sulfite-glyoxal system of my adhesive compositions the hereinafter described mechanism is responsible for the extended pot life of these compositions.

Sodium sulfite reacts with both the protein and the glyoxal present in the composition. Thus, in the method of formulating my compositions, the sulfite first reacts with the protein at sulfur bonds. Then when the glyoxal is added to the system it reacts with both the available protein and available sulfite ions. It is reasonable to assume, however, that the reaction of the glyoxal with sulfite would proceed more rapidly than the glyoxal-protein reaction. In the resulting liquid composition, the clay constituent preferentially absorbs the combined sulfite ions from both the protein and the glyoxal, thus in effect allowing these two components of the system (i. e. protein and glyoxal) to react with each other. This adsorption of the slulfite ions by the clay and the subsequent reaction between the glyoxal and protein takes place slowly. This results in a continuing slow insolubilization of the protein by the glyoxal until a point is finally reached where so much protein has been insolubilized that the liquid adhesive, upon application, is no longer capable of developing a water resistant bond. This is then the determining factor in the pot life of my adhesive compositions.

It is to be understood that various modifications may be made in the above process without departing from the scope of my invention. For example, a deflocculating agent may be used in dispersing the clay to make the initial slurry. For this purpose I have found that sodium tripolyphosphate or tetrasodium pyrophosphate are eminently suitable. These agents are normally added in an amount up to about 0.5% by weight of the clay although any amount sufficient to promote substantially complete dispersion of the clay may be used.

Also, if desired, the glyoxal may be added as a 30% aqueous solution (commercial grade). However, in such instance the glyoxal must be added slowly or difficulties with local gelling may be encountered.

In a further variation of the above process, other dispersants, compatible with glyoxal, may be used in conjunction with sodium sulfite. Thus, ammonium hydroxide may be used as the dispersant in amounts from about 8% to about 11% by weight of the protein and in the presence of sodium sulfite in an amount from about 1% to about 3% by weight of the protein.

In addition, with the various formulations referred to above preservatives may be added to inhibit bacteriological decomposition. Examples of such preservatives are:

Vanicide 41 (aqueous sodium salt of 2-mercapto benzothiazole), Vanicide 21 (cetyl amine salt of 2-mercapto benzothiazole), Dowicide 1 (orthophenyl phenol), Dowicide 2 (2,4,5 trichlorophenol), and Dowicide G (sodium salt of pentachlorophenol). It is to be appreciated that certain of the preservatives will be more compatible with some adhesive formulations than others and consequently some discretion must be observed in selecting the particular preservative to be used.

I should further like to point out that, if desired, the ingredients of my compositions, with the exception of the glyoxal, may be blended in the dry state. To then prepare my compositions this dry mix is dispersed in water and the glyoxal is added thereto. Alternatively, my compositions may be prepared in the liquid form but with no glyoxal present. The glyoxal may then be added just prior to use. Pot life is measured from glyoxal addition.

In the following examples, which, it is to be understood, are illustrative only, the following methods were used to establish the various characteristics of the adhesive compositions of my invention.

Viscosity

Viscosities of all adhesive compositions were determined with the Brookfield viscometer operating with a #4 spindle at 60 revolutions per minute. Measurements were made at 90± 3° F. about one hour after the addition of glyoxal.

Since the compositions of my invention are thixotropic in character precautions attendant upon measuring the viscosity of thixotropic compositions were exercised. Thus, if the adhesive compositions remained undisturbed for any length of time they were first thoroughly agitated and the viscosity was measured within 2 to 3 minutes after agitation had been stopped.

Laminating

Two sheets of paperboard were clamped to a glass plate and a film of adhesive composition was spread between them using a Meier rod. The sheets were immediately pressed together by hand and given three passes between motor-driven, spring-loaded rubber rollers exerting a pressure of about 20 to 40 p. s. i.

Fiber rupture test

This test was used as a measure of the strength of the bonds formed by the adhesives. The paper or paperboard sheets laminated according to the foregoing method were pulled apart at the glue line fifteen seconds after laminating. Fiber rupture was noted and rated as follows.

Rating: Percent fiber rupture
  Good _____ 90–100
  Fair _____ 80–90
  Poor _____ 50–80
  Very poor_____ <50

Water resistance

The edges of laminated sheets were trimmed to insure good sealing at the edges. Water resistance was evaluated by soaking laminated sheets in water from 24 hours at room temperature and then after removal of excess water flexing the edges with the thumb to note any delamination of the glue line.

Water resistance was rated as follows:

Satisfactory: No delamination at glue line.
Satisfactory edge penetration (Satisfactory E. P.): 1/16 in. to 1/8 in. delamination of glue line at edge of paper.
Large edge penetration (Large E. P.): 1/8 in. to 1/2 in. delamination at edges.
Delaminated: Sheets could be separated with very little or no fiber rupture.

The "Satisfactory" and "Satisfactory, edge penetration" ratings were considered representative of adequate water resistance in the adhesives under test.

Many types of paper and paperboard suitable for solid fiber laminating have different adhesive formulation requirements. For example, certain types of soft chipboard require formulations having high clay to protein ratios to inhibit penetration of the adhesive into the porous board, whereas hard kraft boards require a lower clay to protein ratio and a higher protein content adhesive to give satisfactory bonding. Consequently, my adhesive compositions were tested on as wide a variety of paperboards as was practical and the fiber rupture, and water resistance data given in the following examples represent average performance of the adhesive on a variety of paperboards.

*Example 1.*—111 parts by weight of KCS clay was dispersed in 218 parts of water containing 0.22 part of tetrasodium pyrophosphate. The resultant slurry was mixed with 70 parts of a substantially unhydrolyzed, chemically isolated, soybean protein and 7 parts of sodium sulfite and the mixture agitated for one hour. While continuing the agitation, 28 parts of a 5% aqueous solution of glyoxal was added to this mixture and the whole was then agitated for a time sufficient to insure thorough dispersion of all the ingredients.

The resultant liquid adhesive composition had the following characteristics.

Viscosity_____ 8000 centipoises.
Fiber rupture_____ Good.
Water resistance_____ Satisfactory.
Pot life_____ 3–4 days.

*Example 2.*—An adhesive composition was prepared in accordance with the procedure of Example 1 except that the amount of sodium sulfite was reduced to 5.6 parts by weight (this was equivalent to 8% by weight of the protein).

The following characteristics were observed in this liquid adhesive composition.

Viscosity_____ 10,000 centipoises.
Fiber rupture_____ Fair.
Water resistance_____ Satisfactory E. P.
Pot life_____ 3–4 days.

A reduction of the amount of sodium sulfite to less than 8% by weight of the protein resulted in an adhesive composition which had a viscosity beyond practical working limits and which gave erratic results in the fiber rupture test because of inadequate dispersion of the protein.

*Example 3.*—An adhesive composition was prepared in accordance with the procedure of Example 1 except that the amount of sodium sulfite was increased to 7.7 parts by weight (equivalent to 11% by weight of the protein).

This composition exhibited the following characteristics.

Viscosity_____ 6000 centipoises.
Fiber rupture_____ Good.
Water resistance_____ Satisfactory.
Pot life_____ 3–4 days.

An increase in the amount of sodium sulfite to a value equivalent to 12% by weight of the protein resulted in an adhesive composition which gave erratic water resistance performance. Long periods of conditioning were necessary before water resistance developed in the bond.

*Example 4.*—A number of adhesive compositions were prepared in accordance with the procedure of Example 1 except that the 8% sodium sulfite formulation of Example 2 was used and that the amount of glyoxal added was varied.

The following results were obtained.

| Glyoxal (percent by weight of Protein) | 1.4% | 1.6% | 1.8% | 2.0% |
|---|---|---|---|---|
| Water Resistance | Delaminated. | Erratic. | Satisfactory. | Satisfactory. |
| Viscosity (centipoises) | 4,550 | 6,650 | 8,500 | 10,000. |
| Pot Life | 3 days | 3 days | 3 days | 3 days. |
| Fiber Rupture | Fair | Good | Good | Good. |

With the above formulation, when greater than 2% by weight of glyoxal was added the viscosity of the composition increased to such an extent tht the composition was no longer practically workable. However, if the solids content of such compositions is reduced by the addition of more water a glyoxal content of up to about 2.2% by weight of the protein can be tolerated with no decrease in the pot life.

*Example 5.*—A liquid adhesive preparation having the following composition was prepared in accordance with the procedure of Example 1.

| | Parts by weight |
|---|---|
| Water | 218 |
| Tetrasodium pyrophosphate | .22 |
| KCS clay | 111 |
| Soybean protein | 53 |
| Sodium sulfite | 4.24 |
| Glyoxal (5% aqueous solution) | 21.2 |

This composition, which contained 13% by weight of protein, had the following characteristics.

| | |
|---|---|
| Viscosity | 3000 centipoises. |
| Fiber rupture | Fair. |
| Water resistance | Satisfactory small E. P. |
| Pot life | 3 days. |

It was suitable for combining plies tolerant of high glue spreads and larger amounts of water, e. g., fibrous insulating board.

*Example 6.*—An adhesive composition of the formula:

| | Parts by weight |
|---|---|
| Water | 275 |
| Tetrasodium pyrophosphate | .28 |
| KCS clay | 140 |
| Soybean protein | 50 |
| Sodium sulfite | 5 |
| Glyoxal (5% aqueous solution) | 20 |
| Dowicide G (10% solution) | 10 | was prepared according to the procedure of Example 1.

This composition which contained 10% by weight of protein was characterized by a viscosity of 2000 centipoises and a pot life of three days. It was found to be satisfactory for bonding kraft paper to wood veneer and developed a water resistant bond in about one week.

Although the bonds obtained with my adhesive composition will normally develop water resistance without additional treatment, if desired, the time required to develop water resistance may be appreciably lessened by the application of heat.

Having thus described my invention, what I claim is:

1. A protein-containing liquid adhesive composition capable of producing a water-resistant bond and particularly suitable for solid fiber laminating consisting essentially of, by weight of the entire composition, from about 10% to about 16% of a substantially unhydrolyzed, chemically isolated, soybean protein, and, by weight of the protein, from about 140% to about 280% of a kaolinite clay, from about 8% to about 11.5% sodium sulfite, and from about 1.7% to about 2.2% of glyoxal, the said adhesive composition containing an amount of water such that the total solids content of the composition is in the range from about 37% to about 44%, and being characterized by a pot life of at least about 72 hours.

2. The adhesive composition of claim 1 wherein there is present as a clay dispersing agent a phosphate selected from the group consisting of sodium tripolyphosphate and tetrasodium pyrophosphate in an amount up to about 0.5% by weight of the clay and sufficient to promote substantially complete dispersion thereof.

3. The adhesive composition of claim 1 wherein the total solids content of the composition is about 40% by weight of the composition.

4. A protein-containing liquid adhesive composition capable of producing a water-resistant bond and particularly suitable for solid fiber laminating consisting essentially of, by weight, about 49.4% water, about 24.6% kaolinite clay, about 17.3% of a substantially unhydrolyzed, chemically isolated, soybean protein, about 1.7% sodium sulfite, about 6.9% of a 5% aqueous solution of glyoxal and a small amount of tetrasodium pyrophosphate as a clay dispersing agent, the said composition being characterized by a pot life of at least about 72 hours.

5. In the manufacture of protein-containing liquid adhesive compositions capable of producing a water-resistant bond in solid fiber laminating, the process which comprises slurrying a kaolinite clay in water, mixing the resultant slurry with a substantially unhydrolyzed, chemically isolated, soybean protein and sodium sulfite, agitating the mixture for about one hour, and, while continuing the agitation, adding glyoxal thereto, the amount of protein being such that the final adhesive composition has a protein content in the range from about 10% to about 16% by weight, the amounts of clay, sodium sulfite and glyoxal comprising respectively, by weight of the protein, from about 140% to about 280%, from about 8% to about 11.5% and from about 1.7% to about 2.2%, and the amount of water being sufficient to achieve an adhesive composition containing from about 37% to about 44% solids, the said process being carried out at a temperature in the range from about 65° to about 100° F.

6. The process of claim 4 wherein the clay is slurried in water to which has been added about 0.2% tetrasodium pyrophosphate by weight of the clay.

References Cited in the file of this patent

UNITED STATES PATENTS

| | | |
|---|---|---|
| 1,955,375 | Cone et al. | Apr. 17, 1934 |
| 2,356,795 | Poarch | Aug. 29, 1944 |
| 2,360,828 | Craig | Oct. 24, 1944 |
| 2,414,858 | Davidson | Jan. 28, 1947 |
| 2,431,119 | Horvath | Nov. 18, 1947 |
| 2,484,878 | Eberl | Oct. 18, 1949 |